(12) United States Patent
Akamatsu

(10) Patent No.: US 7,758,251 B2
(45) Date of Patent: Jul. 20, 2010

(54) DRAWN CUP NEEDLE ROLLER BEARING

(75) Inventor: Hideki Akamatsu, Iwata (JP)

(73) Assignee: NTN Corporation, Osaka (JP)

( * ) Notice: Subject to any disclaimer, the term of this patent is extended or adjusted under 35 U.S.C. 154(b) by 278 days.

(21) Appl. No.: 11/510,633

(22) Filed: Aug. 28, 2006

(65) Prior Publication Data

US 2007/0047862 A1  Mar. 1, 2007

(30) Foreign Application Priority Data

Aug. 30, 2005  (JP) ............... 2005-249723

(51) Int. Cl.
*F16C 33/58* (2006.01)
*F16C 33/64* (2006.01)
*F16C 33/72* (2006.01)

(52) U.S. Cl. .............. 384/564; 384/484; 384/559; 384/625

(58) Field of Classification Search ........... 384/481, 384/484–485, 492, 559, 564–565, 569, 625, 384/561, 572, 576–580; 29/898.061, 898.013, 29/898.2; 277/353, 362, 462, 558, 566; 148/318, 232

See application file for complete search history.

(56) References Cited

U.S. PATENT DOCUMENTS

| | | | | |
|---|---|---|---|---|
| 2,274,137 A * | 2/1942 | Frauenthal et al. | ........... | 384/484 |
| 2,368,175 A * | 1/1945 | Thomas | ........... | 384/561 |
| 3,200,615 A * | 8/1965 | Stokely | ........... | 277/353 |
| 3,253,869 A * | 5/1966 | Smith | ........... | 384/564 |
| 3,447,848 A * | 6/1969 | Pitner | ........... | 384/484 |
| 3,479,100 A * | 11/1969 | Pitner | ........... | 384/484 |
| 3,549,221 A * | 12/1970 | Leak | ........... | 384/484 |
| 3,601,457 A * | 8/1971 | Helms | ........... | 384/485 |
| 3,788,100 A * | 1/1974 | Pitner | ........... | 384/477 |
| 4,530,675 A * | 7/1985 | Mazziotti | ........... | 277/362 |
| 4,834,691 A * | 5/1989 | Schultze et al. | ........... | 384/486 |
| 4,861,315 A * | 8/1989 | Mazziotti | ........... | 384/481 |
| 5,407,387 A * | 4/1995 | Mazziotti et al. | ........... | 464/131 |
| 5,597,356 A * | 1/1997 | Rieder | ........... | 384/484 |
| 5,626,520 A * | 5/1997 | Mazziotti | ........... | 277/566 |
| 5,848,846 A | 12/1998 | Sugiyama et al. | | |
| 6,077,166 A * | 6/2000 | Reynolds | ........... | 464/133 |
| 6,102,579 A * | 8/2000 | Kupietz | ........... | 384/576 |
| 6,562,151 B2 * | 5/2003 | Hirakawa et al. | ........... | 148/318 |
| 6,644,860 B2 * | 11/2003 | Fuchida et al. | ........... | 384/569 |
| 6,769,351 B2 * | 8/2004 | Lang et al. | ........... | 92/72 |
| 7,044,859 B2 * | 5/2006 | Menosky et al. | ........... | 464/128 |

(Continued)

FOREIGN PATENT DOCUMENTS

DE   2708137 B1 *  6/1978

(Continued)

*Primary Examiner*—Marcus Charles
(74) *Attorney, Agent, or Firm*—Clark & Brody

(57) ABSTRACT

A drawn cup needle roller bearing comprises a drawn cup having flanges formed by a bending process at both ends, rollers arranged along the inner diameter surface of the drawn cup, and a no-metal cored seal incorporated on the inner diameter side of the drawn cup. The drawn cup in which the rollers are incorporated is heat treated and the no-metal cored seal is elastically deformed and incorporated inside the drawn cup past the flange. Here, the roller has a nitrogen-enriched layer on its surface layer, and the nitrogen-enriched layer contains not less than 20% by volume of retained austenite.

9 Claims, 5 Drawing Sheets

U.S. PATENT DOCUMENTS

2005/0238275 A1 * 10/2005 Yoshiba et al. ............... 384/625

FOREIGN PATENT DOCUMENTS

| DE | 19732478 | | 1/1998 |
|---|---|---|---|
| JP | 61-256066 A | | 11/1986 |
| JP | 07279952 A | * | 10/1995 |
| JP | 10-046318 | | 2/1998 |
| JP | 10-237620 | | 9/1998 |
| JP | 2001-99145 A | * | 4/2001 |
| JP | 2004-183806 A | | 7/2004 |
| JP | 2004-293620 A | | 10/2004 |

* cited by examiner

DRAWN CUP NEEDLE ROLLER BEARING

BACKGROUND OF THE INVENTION

1. Field of the Invention

The present invention relates to a drawn cup needle roller bearing.

2. Description of the Background Art

Conventionally, as a bearing used in a transmission, a compressor for a car air conditioner, a stator and the like, a drawn cup needle roller bearing has been used because it can receive high load although its projected area is small, and its cost is low. Such drawn cup needle roller bearing comprises a drawn cup, a plurality of rollers arranged along the inner diameter surface of the drawn cup on which the rollers rotate, and a retainer for retaining the plurality of rollers.

Here, a manufacturing method of a conventional drawn cup needle roller bearing will be briefly described. FIG. 6 is a schematic view showing an example of a manufacturing method of the conventional drawn cup needle roller bearing. Referring to FIG. 6, first, a flat steel plate 101 that is the material of a drawn cup is formed into a shape of a cup by a deep drawing process and the bottom of the cup is punched out and one flange 102 is formed. Then, a treatment for a rolling surface 103 is performed and a quenching treatment such as a carburized quenching treatment is performed for the whole drawn cup. Here, since the quenching treatment is performed once after the bottom of the cup has been punched out, a carburization proof treatment or an annealing treatment is to be performed so that an edge part 104 may not be cracked at the time of bending before a flange 107 is bent at an entrance of the cup. Then, rollers 105 and a retainer 106 are incorporated and the edge part 104 is bent and the other flange 107 is formed. Thus, the drawn cup needle roller bearing is completed through a step of cleaning and the like.

As the material of the roller to be incorporated, JIS SUJ steel is used in general. The roller contains retained austenite that is gradually reduced from its surface layer to the inside and its amount is 15% by volume at most in general. As a result, Vickers hardness (Hv) value of the surface of the roller is about 700 to 750. In addition, as the material of the drawn cup, case-hardening steel such as JIS SCM415 steel is used, and as the material of the retainer to be incorporated, normal cold-rolled steel (JIS SPCC steel, for example) is used and soft-nitrided to improve the hardness thereof.

According to the drawn cup needle roller bearing manufactured as described above, since the carburization proof treatment or the annealing treatment is performed at the edge part 104, the hardness of the edge part 104 is low, so that the drawn cup has uneven hardness. Furthermore, since a heat treatment history is different, there is a variation in diameters at both ends where the flanges are bent and diameter of a center part, so that its roundness cannot be preferable. As a result, a long life cannot be implemented.

In view of the above problems, Japanese Unexamined Patent Publication No. 10-46318 discloses a manufacturing method in which after rollers and a retainer are incorporated, an edge part 104 is bent and then an entire drawn cup needle roller bearing comprising the rollers and the retainer is heat treated.

According to the Japanese Unexamined Patent Publication No. 10-46318, since the entire drawn cup needle roller bearing is heat treated after the rollers and the retainer have been incorporated and the edge has been bent, an annealing treatment and the like is not necessary. Therefore, its roundness is preferable and the hardness of the drawn cup does not become partially low. Thus, a long life can be implemented. In addition, since the heat treatment process can be simple, the drawn cup needle roller bearing can be manufactured at low cost.

According to the drawn cup needle roller bearing manufactured by the above method, since a long life and low cost can be implemented, it can be used in various kinds of usages. For example, it can be used as a bearing that supports a throttle shaft in a throttle valve machine that requires a small bearing projected area and low cost. Here, when it is used as the bearing that supports the throttle shaft, it is required that the bearing is superior in sealing property, that is, fluid leakage preventing function.

A seal to be incorporated to prevent the fluid leakage includes a seal comprising a metal core. However, since the metal core is rigid, it is difficult to change its configuration, so that it cannot be incorporated inside the drawn cup after the bending process in the manufacturing process disclosed in the Japanese Unexamined Patent Publication No. 10-46318. Therefore, it is necessary to incorporate it inside the drawn cup before the bending process is performed. However, since the seal lacks in durability at a high temperature, when it is heat treated under the same condition as that of the drawn cup and the like at the heat treatment process, the seal is considerably damaged. Thus, the low cost, long life and high sealing property cannot be implemented at the same time.

SUMMARY OF THE INVENTION

It is an object of the present invention to provide a drawn cup needle roller bearing having a high sealing property and a long life and manufactured at low cost.

A drawn cup needle roller bearing according to the present invention comprises a drawn cup having flanges formed by an inward bending process at both ends, rollers arranged along the inner diameter surface of the drawn cup, and a no-metal cored seal incorporated on the inner diameter side of the drawn cup. Here, the roller has a nitrogen-enriched layer on its surface layer, and the nitrogen-enriched layer contains not less than 20% by volume of retained austenite.

According to the above constitution, since the hardness of the roller surface can be ensured, indentation produced by a contaminant is reduced, so that its long life can be implemented.

In addition, according to the drawn cup needle roller bearing having the above constitution, after the rollers and the retainer has been incorporated, the whole body is heat treated and manufactured, so that the drawn cup roundness is satisfactory and the drawn cup hardness does not become partially low. Furthermore, since the heat treatment process such as the annealing treatment can be simplified, it can be manufactured at low cost.

Still furthermore, since the no-metal cored seal is inexpensive as compared with a metal cored seal and can be elastically deformed enough, it can be incorporated inside the drawn cup after both ends of the drawn cup have been bent. Thus, the heat treatment is performed after the rollers have been incorporated and both ends of the drawn cup have been bent, and then the no-metal cored seal can be incorporated in the drawn cup needle roller bearing, so that a sealing property of the drawn cup needle roller bearing can be improved.

Preferably, the outer diameter of the no-metal cored seal has an interference for an amount of heat shrinkage. Thus, even when the no-metal cored seal shrinks at a low temperature and its outer diameter becomes small, since the outer diameter dimension of the no-metal cored seal has the interference for the heat shrinkage amount, a gap is not generated between the outer diameter surface of the no-metal cored seal and the inner diameter surface of the drawn cup. Therefore, the outer diameter surface of the no-metal cored seal and the inner diameter surface of the drawn cup can be nipped at an appropriate pressure even at a low temperature, so that its sealing property is improved.

More preferably, the outer diameter surface of the no-metal cored seal has a small diameter part having a relatively small diameter, and a large diameter part projecting from the small diameter part in the diameter direction and having a relatively large diameter. According to this constitution, when the no-metal cored seal is incorporated in the drawn cup needle roller bearing, a shrinkage amount of the no-metal cored seal toward the inner diameter side can be reduced. Thus, a nipping amount between a lip and a rotation shaft can be appropriately provided, so that the no-metal cored seal and the rotation shaft can be prevented from rotating together during rotation. As a result, the sealing property can be improved.

Further preferably, the thickness of the nitrogen-enriched layer of the roller is not less than 0.1 mm, and the Vickers hardness (Hv) value of the surface of the roller is not less than 750. According to the above definition, the surface hardness of the roller can be ensured and its long life can be implemented.

Further preferably, the drawn cup comprises a nitrogen-enriched layer on its outer circumference surface, and the nitrogen-enriched layer of the drawn cup contains not less than 25% in volume of retained austenite. Thus, the hardness of the drawn cup that is a component of the drawn cup needle roller bearing can be ensured, and its long life can be implemented. Here, since the drawn cup is thin as compared with the roller, the retained austenite amount on the outer circumference surface has to be more than that of the surface layer of the roller.

Further preferably, the thickness of the nitrogen-enriched layer of the drawn cup is not less than 0.05 mm.

In addition, the hardness of the flanges of the drawn cup at both ends is uniform. Thus, since the hardness does not become partially low, the long life can be implemented.

Further preferably, the drawn cup needle roller bearing comprises a retainer for retaining the rollers. Here, the retainer has a nitrogen-enriched layer on its surface, and Vickers hardness (Hv) value of the surface of the retainer is not less than 750. Thus, the hardness of the retainer contained in the drawn cup needle roller bearing can be also ensured and its long life can be implemented.

According to the present invention, since the hardness of the roller surface can be ensured, indentation produced by a contaminant is reduced, so that its long life can be implemented. In addition, according to the drawn cup needle roller bearing having the above constitution, since the rollers and the retainer are incorporated and then the whole body is heat treated and manufactured, the drawn cup roundness is satisfactory and the drawn cup hardness does not become partially low. Furthermore, since the heat treatment process such as the annealing treatment can be simplified, it can be manufactured at low cost. Still furthermore, since the no-metal cored seal is inexpensive as compared with the metal cored seal and can be elastically deformed enough, it can be incorporated inside the drawn cup after both ends of the drawn cup have been bent. Thus, the heat treatment is performed after the rollers have been incorporated and both ends of the drawn cup have been bent, and then the no-metal cored seal is incorporated in the drawn cup needle roller bearing, so that the sealing property of the drawn cup needle roller bearing can be improved.

As a result, the drawn cup needle roller bearing implements a low cost, long life and a high sealing property.

DESCRIPTION OF THE PREFERRED EMBODIMENTS

Figure 2:
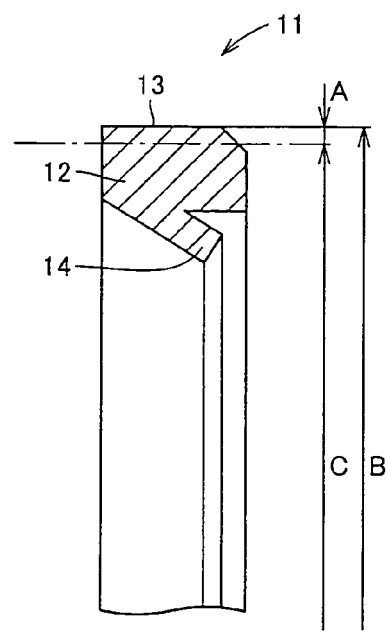
FIG. 2 is a sectional view showing a part the no-metal cored seal incorporated in a drawn cup needle roller bearing according to one embodiment of the present invention.

Embodiments of the present invention will be described with reference to the drawings hereinafter. FIG. 2 is a sectional view showing a part of a no-metal cored seal 11 contained in a drawn cup needle roller bearing according to one embodiment of the present invention. In FIG. 2, the inner diameter surface of a drawn cup (not shown) that will be described below, positioned on the outer diameter side of the no-metal cored seal 11 is shown by a dashed line. Referring to FIG. 2, the no-metal cored seal 11 consists of an elastic annular member 12 only. Therefore, it can be largely elastically deformed.

Here, the outer diameter dimension B of the no-metal cored seal 11 is a dimension in which an interference 2A for an amount of heat shrinkage is added to the inner diameter dimension C of the drawn cup. Here, the interference for the amount of heat shrinkage means an interference in which a shrinkage amount of the no-metal cored seal 11 at a low temperature is considered. In addition, a lip 14 for nipping a rotation shaft positioned on the inner diameter side after incorporated is provided on the inner diameter side of the no-metal cored seal 11.

Figure 1:
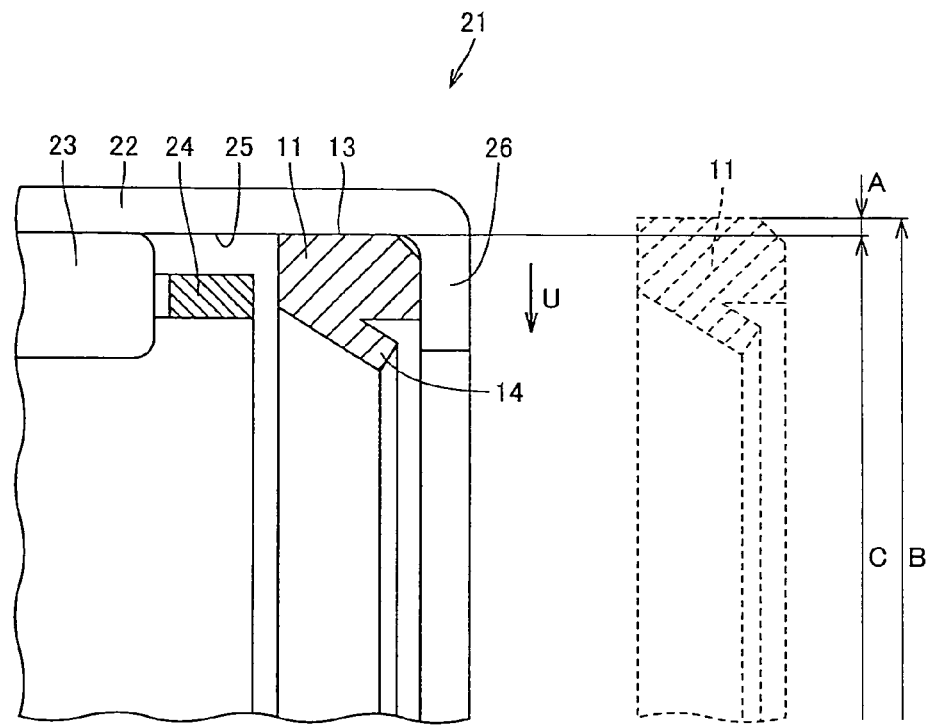
FIG. 1 is a sectional view showing a part of a state in which a no-metal cored seal is incorporated in a drawn cup needle roller bearing.

The drawn cup needle roller bearing according to one embodiment of the present invention will be described hereinafter. FIG. 1 is a sectional view showing a part of the drawn cup needle roller bearing comprising the above no-metal cored seal 11. In addition, the free no-metal cored seal 11 before incorporated is designated by a dotted line. Referring to FIG. 1, a drawn cup needle roller bearing 21 comprises a drawn cup 22, a plurality of rollers 23, a retainer 24 for retaining the plurality of rollers 23, and a no-metal cored seal 11. The roller 23 and the retainer 24 are heat treated at a step that will be described below together with the drawn cup 22. The roller 23 and the retainer 24 are arranged along an inner diameter surface 25 of the drawn cup 22. The drawn cup 22 has flanges 26 bent at both ends thereof. The no-metal cored seal 11 is incorporated on the inner diameter side of the drawn cup 22. The no-metal cored seal 11 is incorporated in a position between the flange 26 and the retainer 24 holding the rollers 23 in the axial direction.

A manufacturing method of the drawn cup needle roller bearing will be described hereinafter. First, according to the roller, a wire rod (JIS SUJ2 steel) is cut and dropped to shape an end face and a tumbling treatment is performed for it. Then, after quenching and tempering treatments and a grinding treatment for the outer diameter, a configuration super process is performed. According to a heat treatment condition of the roller, the oil quenching treatment is performed at 840° C. for 30 minutes and the tempering treatment is performed at 180° C. for 90 minutes. Finally, its dimension is selected, whereby the roller is completed.

According to the retainer, a sectional configuration is formed of a band steel (JIS SPC steel) and pockets are punched out. Then, it is cut and bent into a cylindrical form and a welding treatment and the like is performed, whereby the retainer is completed.

According to the drawn cup, a band steel (JIS SCM415 steel) is formed into a shape of a cup by a deep drawing process and the bottom of the cup is punched out and one flange is formed. Then, a treatment for a rolling surface is performed and the roller and the retainer manufactured by the above-described methods are incorporated and the other flange is formed by bending an edge on a cup entrance side. Then, a carbonitriding treatment is performed, and quenching and tempering treatments are performed. Here, according to a carbonitriding treatment condition, the drawn cup with the rollers and the retainer is held in a carbonitriding atmosphere (1 to 3% by volume of ammonium is added to RX gas) at 840 to 850° C. for 30 minutes and then immediate oil cooling is performed.

After the quenching and tempering treatments, the no-metal cored seal 11 is incorporated on the inner diameter side of the drawn cup 22. First, the no-metal cored seal 11 is pressed to shrink toward the inner side in the diameter direction shown by an arrow U in FIG. 1. In this case, the no-metal cored seal 11 may be deformed into an ellipse and the like. Then, it is incorporated inside the drawn cup 22 past the flange 26 and arranged in the predetermined position.

After incorporated, since the deformed no-metal cored seal 11 tries to restore the diameter, the outer diameter surface of the no-metal cored seal 11 and the inner diameter surface 25 of the drawn cup 22 are nipped at an appropriate pressure. In addition, on the inner diameter side also, the elastic lip 14 nips the outer diameter surface of the rotation shaft. Thus, the no-metal cored seal 11 is incorporated in the drawn cup 22, whereby the drawn cup needle roller bearing 21 is completed.

Here, the life of the drawn cup needle roller bearing was compared with that of a drawn cup needle roller bearing manufactured by a conventional manufacturing method. The conventional manufacturing method is as follows.

First, according to a roller, a wire rod (JIS SUJ2 steel) is cut and dropped to shape an end face and a tumbling process is performed for it. Then, after quenching and tempering treatments and a grinding treatment for the outer diameter, a configuration super process is performed. According to a heat treatment condition of the roller, the oil quenching treatment is performed at 840° C. for 30 minutes and the tempering treatment is performed at 180° C. for 90 minutes. Finally, its dimension is selected, whereby the roller is completed.

According to the retainer, a sectional configuration is formed of a band steel (JIS SPC steel) and pockets are punched out. Then, it is cut and bent into a cylindrical form and a welding treatment and the like is performed, whereby the retainer is completed. In addition, a soft nitriding treatment has been performed for the retainer at 570 to 580° C. for 35 minutes.

According to the drawn cup, a band steel (JIS SCM415 steel) is formed into a shape of a cup by a deep drawing process and the bottom of the cup is punched out and one flange is formed. Then, a carburizing treatment is performed (in a RX gas atmosphere) at 840 to 890° C. for 60 minutes, an oil quenching treatment is performed and a tempering treatment is performed at 165° C. for 60 minutes. In addition, an annealing treatment for one flange is performed by high-frequency heating.

Then, the rollers and the retainer manufactured by the above-described manufacturing methods are incorporated in the drawn cup, and the other flange is formed by bending the edge toward the inner side in the diameter direction, whereby the drawn cup needle roller bearing is completed.

Characteristics of the product according to the present invention and the conventional product are shown in Table 1 together with roundness and life. In addition, evaluation standards for the roundness and life are as follows. In addition, the bearing used in the test was an open end drawn cup needle roller bearing having the inner diameter of 15 mm, the outer diameter of 23 mm, and the width of 16 mm. In addition, the invented product and the conventional product are same in size.

(Roundness) Regarding the outer diameter of the drawn cup, roundness of the outer circumferential surface on the side of the flange formed by the bending process finally (at a position of 12.7 mm apart from the end face of the flange formed by the pressing process first) was measured using Talyrond and a ratio was found based on assumption that the conventional product is 1.

(Life) A fatigue life test was performed under the following condition and the invented product was compared with the conventional one.

Rotation speed: 5000 rpm
Radial load: 572 kgf.

TABLE 1

| | Item | Invented product | Conventional product |
|---|---|---|---|
| Needle roller | Retained austenite amount (% by volume) | Surface layer: 20% or more (20~30%) Inside: 13~17% | Surface layer: 11~13% Inside: 11~13% |
| | Nitrogen-enriched layer thickness | 0.1 mm or more | Nothing |
| | Surface hardness (Hv) | 750~800 | 700~800 |
| | Inside hardness (Hv) | 750~800 | 700~800 |
| Drawn cup | Retained austenite amount (% by volume) | Surface layer: 25% or more (25~35%) | Surface layer: 15~20% |
| | Nitrogen-enriched layer thickness | 0.05 mm or more | Nothing |
| | Flange hardness on the pressed side | 750~800 | 700~800 |
| | Flange hardness on the bent side | 750~800 | 500~550 |
| Retainer | Surface hardness (Hv) | 750~800 | 350~550 |
| | Inside hardness (Hv) | 750~800 | 150~170 |
| | Roundness of drawn cup | ½ | 1 |
| | Life L10 (hours) | 142 | 70 |

Referring to Table 1, according to the present invention, the roundness is improved and the life is elongated as compared with the conventional product.

As described above, the drawn cup needle roller bearing 21 manufactured by the above method implements a long life. Since the manufacturing method does not comprises an annealing process at the heat treatment process, and the no-metal cored seal 11 comprising only the elastic annular member is used, it can be inexpensively manufactured. Furthermore, since the no-metal cored seal 11 is provided inside the drawn cup, a high sealing property can be provided.

In addition, as described above, since the outer diameter of the no-metal cored seal 11 has the interference for the amount of heat shrinkage, a gap is not generated between the outer diameter surface 13 of the no-metal cored seal 11 and the inner diameter surface 25 of the drawn cup 22 even at a low temperature. Therefore, the drawn cup needle roller bearing 21 implements a high sealing property even at a low temperature.

Figure 3:
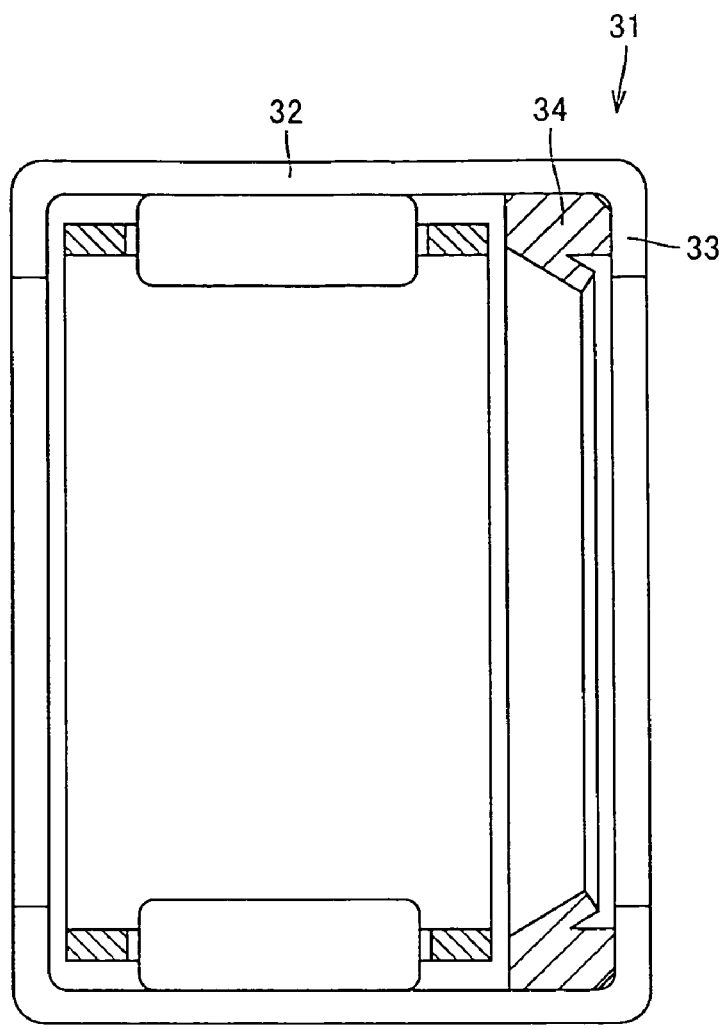
FIG. 3 is a sectional view showing a drawn cup needle roller bearing in which the no-metal cored seal is incorporated on the side of one flange.
Figure 4:
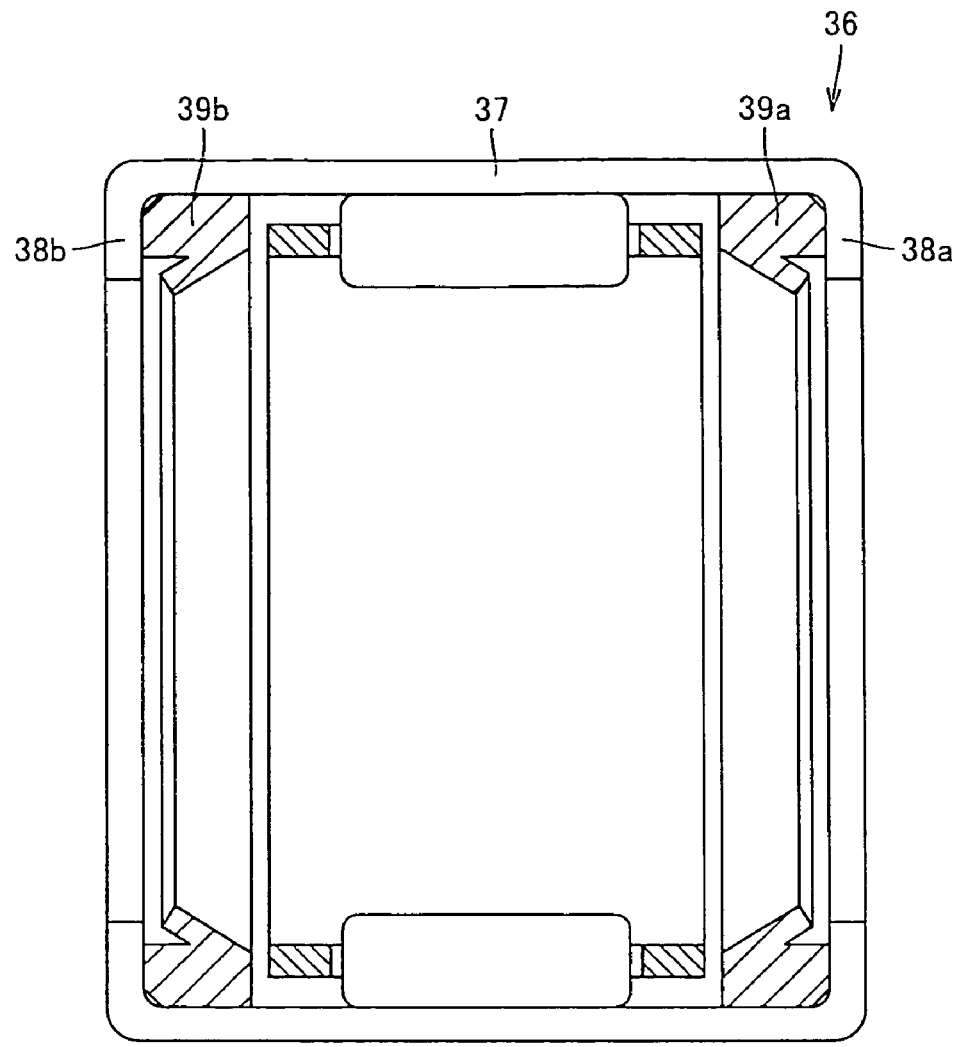
FIG. 4 is a sectional view showing a drawn cup needle roller bearing in which the no-metal cored seal is incorporated on both sides of flanges.

Here, the drawn cup needle roller bearing may incorporate the no-metal cored seal on one side of the flange of the drawn cup, or may be incorporated on both sides of the flanges. FIG. 3 is a sectional view showing a drawn cup needle roller bearing in which a no-metal cored seal is incorporated on one side of the flange. Referring to FIG. 3, according to a drawn cup needle roller bearing 31, a no-metal cored seal 34 is incorporated on the side of one flange 33 of a drawn cup 32. Thus, leakage on the side of one flange 33 can be prevented. In addition, FIG. 4 is a sectional view showing a drawn cup needle roller bearing when a no-metal cored seal is incorporated on each side of a flange. Referring to FIG. 4, according to a drawn cup needle roller bearing 36, no-metal cored seals 39a and 39b are incorporated on both sides of flanges 38a and 38b of a drawn cup 37. Thus, leakage on both sides of the flanges 38a and 38b can be prevented.

Figure 5A:
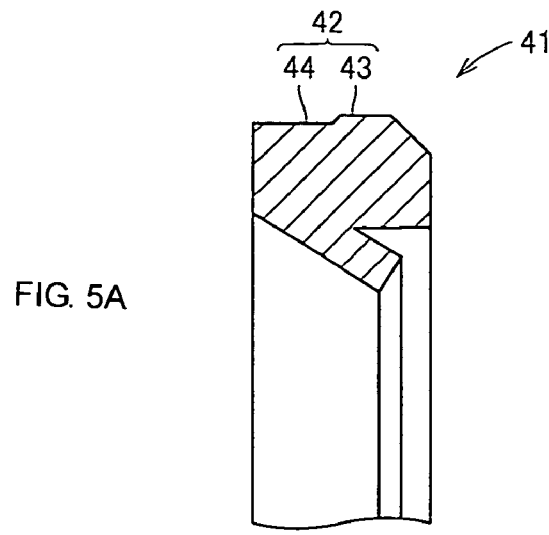
FIG. 5A is a sectional view showing a part of a no-metal cored seal according to another embodiment in which a small diameter part and a large diameter part are provided.

In addition, although the outer diameter surface of the no-metal cored seal is along the inner diameter surface of the drawn cup in the above embodiment, the present invention is not limited to this. For example, a no-metal cored seal may has a small diameter part having a relatively small diameter, and a large diameter part projecting from the small diameter part in the diameter direction and having a relatively large diameter. FIG. 5A is a sectional view showing a part of a no-metal cored seal 41 in this case. Referring to FIG. 5A, an outer diameter surface 42 of the no-metal cored seal 41 has a step between a small diameter part 44 having a relatively small diameter, and a large diameter part 43 projecting from the small diameter part 44 in the diameter direction and having a relatively large diameter. Thus, when it is incorporated in the drawn cup needle roller bearing, since a shrinkage amount of the no-metal cored seal 41 toward the inner diameter side can be reduced, a nipping degree between a lip and a rotation shaft can be appropriately provided. Therefore, both no-metal cored seal 41 and rotation shaft can be prevented from rotating together at the time of rotation, so that a high sealing property can be provided.

Figure 5B:
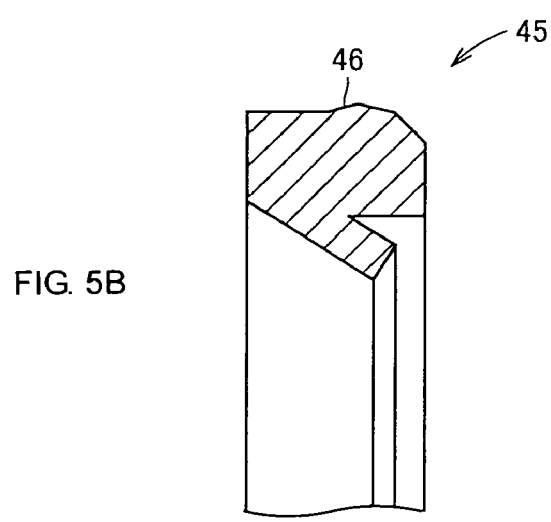
FIG. 5B is a sectional view showing a part of a no-metal cored seal according to another embodiment in which a large diameter part is projected.
Figure 5C:
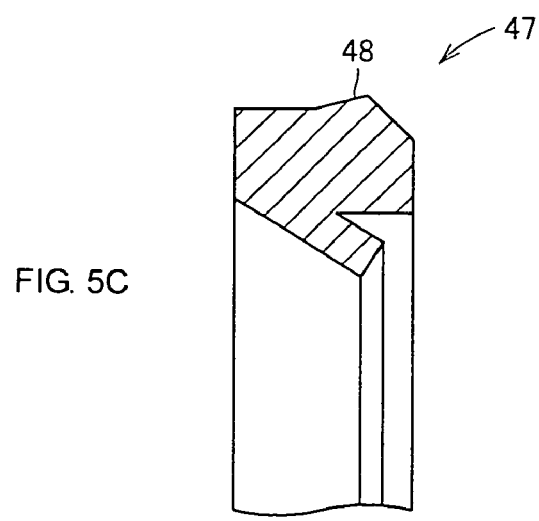
FIG. 5C is a sectional view showing a part of a no-metal cored seal according to another embodiment in which an outer diameter surface is tapered.
Figure 6:
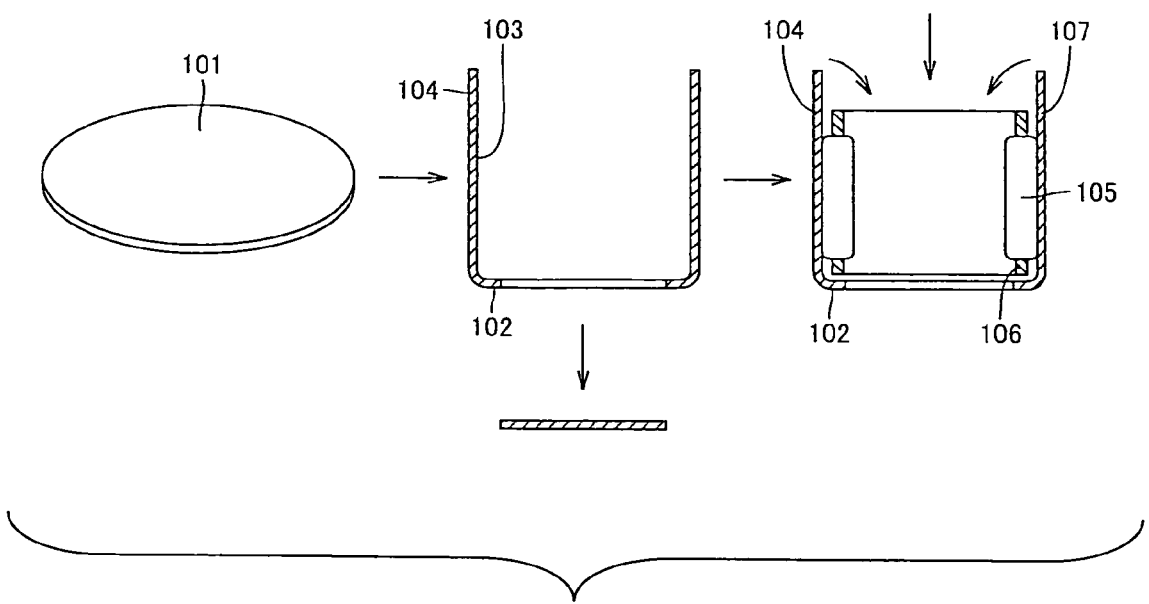
FIG. 6 is a schematic view showing steps when a conventional drawn cup needle roller bearing is manufactured.

Furthermore, although the large diameter part and the small diameter part in the outer diameter surface are connected along the inner diameter surface of the drawn cup through the step in the above, the outer diameter surface of the no-metal cored seal may have another configuration. For example, as shown in FIG. 5B, a large diameter part 46 of a no-metal cored seal 45 may not have a configuration along an inner diameter surface but may have a smooth projected configuration. Furthermore, as shown in FIG. 5C, a no-metal cored seal 47 may have a configuration such that a large diameter part is continued from a small diameter part through a taper 48 and having a configuration that is hardly along an inner diameter surface. Still furthermore, a plurality of large diameter parts and a plurality of small diameter parts may be provided in the outer diameter surface in the axial direction, or a part other than the large diameter part and the small diameter part may be provided in the outer diameter surface.

In addition, although the drawn cup needle roller bearing comprises the retainer in the above embodiment, the present invention may be applied to a full-complement roller type needle roller bearing without comprising the retainer.

Although the embodiments of the present invention have been described with reference to the drawings in the above, the present invention is not limited to the above-illustrated embodiments. Various kinds of modifications and variations may be added to the illustrated embodiments within the same or equal scope of the present invention.

Since the drawn cup needle roller bearing according to the present invention has a long life span, can be manufactured inexpensively, and provides a high sealing property, it can be effectively used as a drawn cup needle roller bearing that requires a long life span and a high sealing property, such as a bearing to support a throttle shaft provided in a throttle valve machine and the like.

What is claimed is:

1. A drawn cup needle roller bearing comprising:
   a drawn cup having flanges formed by an inward bending process at both ends;
   rollers arranged along the inner diameter surface of said drawn cup; and
   a no-metal cored seal incorporated on the inner diameter side of said drawn cup, wherein
   said roller has a nitrogen-enriched layer on its surface layer, and
   said nitrogen-enriched layer contains not less than 20% by volume of retained austenite,
   wherein the flanges of the cup have equal hardness as a result of the drawn cup being heat treated after forming of both flanges and the drawn cup needle bearing is used to support a throttle shaft provided in a throttle valve machine or used as a stator.

2. The drawn cup needle roller bearing according to claim 1, wherein the outer diameter of said no-metal cored seal has an interference for an amount of heat shrinkage.

3. The drawn cup needle roller bearing according to claim 1, wherein the outer diameter surface of said no-metal cored seal has a small diameter part having a relatively small diameter, and a large diameter part projecting from the small diameter part in the diameter direction and having a relatively large diameter.

4. The drawn cup needle roller bearing according to claim 1, wherein the outer diameter of said no-metal cored seal has an interference for an amount of heat shrinkage, and the outer diameter surface of said no-metal cored seal has a small diameter part having a relatively small diameter, and a large diameter part projecting from the small diameter part in the diameter direction and having a relatively large diameter.

5. The drawn cup needle roller bearing according to claim 1, wherein the thickness of said nitrogen-enriched layer of the roller is not less than 0.1 mm.

6. The drawn cup needle roller bearing according to claim 1, wherein the Vickers hardness (HV) value of the surface of said roller is not less than 750.

7. The drawn cup needle roller bearing according to claim 1, wherein said drawn cup comprises a nitrogen-enriched layer on its outer circumference surface, and
   the nitrogen-enriched layer of said drawn cup contains not less than 25% in volume of retained austenite.

8. The drawn cup needle roller bearing according to claim 1, wherein the thickness of the nitrogen-enriched layer of said drawn cup is not less than 0.05 mm.

9. The drawn cup needle roller bearing according to claim 1, wherein said drawn cup needle roller bearing comprises a retainer for retaining the rollers,
said retainer has a nitrogen-enriched layer on its surface, and
Vickers hardness (Hv) value of the surface of said retainer is not less than 750.

* * * * *